United States Patent Office 3,767,709
Patented Oct. 23, 1973

3,767,709
ALCOHOL AMINE INTERCHANGE
Donald M. Fenton, Anaheim, Calif., assignor to Union
Oil Company of California, Los Angeles, Calif.
No Drawing. Filed Sept. 2, 1971, Ser. No. 177,499
Int. Cl. C07c 85/02, 85/06
U.S. Cl. 260—583 R                      10 Claims

ABSTRACT OF THE DISCLOSURE

A tertiary amine is reacted with an alcohol or aldehyde in a liquid reaction medium containing a ruthenium, osmium, rhenium or technetium catalyst which is preferably in complex association with a biphyllic ligand to interchange the hydrocarbyl portions of the reactants. A typical process comprises contacting tributylamine with octanol in the presence of ruthenium trichloride and triphenylphosphine to produce butanol and octyldibutylamine. Aldehydes can be similarly reacted under hydrogen pressure.

---

The invention relates to the interchange of hydrocarbyl groups of an amine with that of an alcohol or aldehyde and to a catalyst for this interchange reaction.

Tertiary amines are commonly obtained by reaction of aliphatic halides with ammonia or primary or secondary amines. This reaction liberates hydrogen halides which are reactive and form the ammonium salt of the amine, thereby requiring further reaction with base to liberate the amine. When fatty amines which are useful as surfactants are desired, such as decyl dimethylamine, the decyl halide reactant is also relatively expensive.

It has now been found that tertiary amines can be reacted with alcohols and/or aldehydes with hydrogen to interchange their hydrocarbyl groups. This reaction can be used to convert an inexpensive amine such as trimethyl amine to a useful surfactant by its reaction with fatty alcohols or similarly long-chained aldehydes. The latter reactants, furthermore, are more readily available and less costly than fatty halides.

The reaction of this invention also offers the chemical synthesis industries another route for the preparation of amines or alcohols by permitting the interchange of hydrocarbyl groups between these reactants.

The reaction of the invention, as illustrated with normal alcohols or aldehydes, proceeds as follows:

$$R_3N + R'CH_2OH \rightarrow R_2NCH_2R' + ROH \quad (I)$$

$$R_3N + R'CHO + H_2 \rightarrow R_2NCH_2R' + ROH$$

The reaction can be controlled to obtain varied degrees of interchange of hydrocarbyl groups on the amine so that one, two or three of these groups can be obtained from the aldehyde or alcohol reactant.

The nitrogen-containing reactant of the invention is a tertiary amine having 1 to 20 carbons, preferably 1 to 15 carbons and having the following structural formula:

$$R_3N$$

wherein R is the same or different alkyl having 1 to about 18 carbons or monocyclic cycloalkyl or aryl having from 6 to about 18 carbons. Preferably, R is alkyl and, most preferably, alkyl having 1 to 10 carbons.

As used hereinabove, alkyl, cycloalkyl and aryl groups are those hydrocarbon groups wherein the nitrogen is bonded, respectively, to an alkyl, cycloalkyl or aryl carbon thus including such groups as aralkyl, alkylcycloalkyl, alkaryl, etc., as well as purely alkyl, cycloalkyl and aryl groups. Examples of suitable R groups are methyl, ethyl, propyl, 2-ethylhexyl, octyl, isooctyl, decyl, octadecyl, 3-phenylbutyl, cyclobutyl, methylcyclopentyl, cyclohexyl, cyclooctyl, diethylcyclohexyl, phenyl, benzyl tolyl, xylyl, duryl, p-amylphenyl, 3,5-dihexylphenyl, etc.

Examples of suitable amines are trimethylamine, triethylamine, tripropylamine, tributylamine, 2-ethylhexyldimethylamine, octyldibutylamine, tetradecyldiethylamine, methyldinoylamine, N,N-dimethylaniline, N,N-diisopropyltoluidine, N,N-dibutylxylidine, p-amylphenyldimethylamine, cyclohexyldibutylamine, 3-phenyloctyldimethylamine, 4-cyclohexyldiamylamine, 2-tolyldiethylamine, dimethylethylamine, butyldipropylamine, cycloheptyldipentylamine, diethyldecylamine, methyldiphenylamine, dicyclohexyloctylamine, methyldicyclononylamine, diphenylcyclohexylamine, tolyldihexylamine, phenylhexylmethylamine, etc. Examples of the preferred alkyl amines are the aliphatic amines such as tributylamine, tripentylamine, trimethylamine, tripropylamine, etc.

The reactant alcohol or aldehyde used in the invention has 1 to 20 carbons, preferably 1 to 15 carbons and is a saturated aliphatic or alicyclic alcohol or aldehyde wherein the oxygen is bonded, respectively, to an alkyl or cycloalkyl carbon. Inert groups such as monocyclic aryls can also be present and the oxygen can be bonded to groups such as aralkyl, cycloalkylalkyl, etc., as well as purely alkyl and cycloalkyl groups.

Examples of suitable alcohols include methanol, ethanol, propanol, isopropanol, butanol, heptanol, tetradecanol, nonanol, decanol, dodecanol, hexadecanol, octadecanol, eicosanol, cyclohexanol, methylcyclopentanol, ethylcyclohexanol, cyclononanol, 3-cyclohexyloctanol, 3-cyclohexyl-4-methyldodecanol, 2-phenylethanol, 3-phenyloctanol, 4-tolyl-6-methyldodecanol, etc. Examples of the preferred alkanols are ethanol, propanol, butanol, octanol, and particularly the fatty alcohols, e.g., the aliphatic $C_4$ to about $C_{20}$ alkanols such as undecanol, dodecanol, heptadecanol, etc.

Examples of suitable aldehydes include: acetaldehyde, propionaldehyde, butyraldehyde, isobutyraldehyde, heptanal, octanal, decanal, nonanal, 2-ethylhexanal, cyclohexanal, 2-cyclohexyloctanal, 3-phenyloctanal, cycloheptanal, etc. The long chain aldehydes having 5 to about 20 carbons and aldehydes produced by hydroformylation of olefins are preferred reactants such as the straight and branched chain aldehydes formed by hydroformylation of alpha olefins, e.g., octanal, 2-octanal, decanal, 2-decanal, dodecanal, 2-dodecanal, octadecanal, etc.

The catalyst of the invention may be ruthenium, osmium, rhenium or technetium, preferably ruthenium. A minor amount of the catalyst is used, e.g., 0.001 to 5 weight percent, preferably 0.001 to 2 percent calculated as the metal and based on the reaction medium. The metal may be added as a salt, complex or oxide such as a halide (chloride, bromide, iodide, or fluoride), oxide, hydroxide, carbonyl, cyanide, hydride, nitrate, sulfate, carbonate, $C_1$–$C_5$ carboxylate, etc., or as an acid. The metal may also be added as a free metal providing the reaction medium includes a complexing agent or anion, such as the aforementioned anions, ammonia, carbon monoxide, a halogen, hydrogen or a biphyllic ligand as will be described hereinafter. Preferably, the catalyst is added as a halide; preferably chloride. Suitable sources of the metal catalyst include ruthenium tetrachloride, ruthenium trichloride, ruthenium cyanide, ruthenium pentacarbonyl, ruthenium carbonyl hydride, ruthenium nitrate, ruthenium hydroxide, ruthenium sulfide, tetraaminorutheniumhydroxychloro chloride, ruthenium acetate, ruthenium benzoate, osmium dichloride, osmium iodide, osmium oxide, osmium nitrate, osmium sulfite, chloroosmic acid, osmium valerate, osmium sulfate, tetraaminoosmiumhydroxy chloride, ruthenium bromide, rhenium pentacarbonyl, rhenium chloride, rhenium dioxide, rhenium heptoxide, rhenium sulfide, trimethylrhenium, dipyridyl perrhenate, technetium chloride, technetium nitrate, technetium oxide, etc. The particular method by which the metal is added to the reaction medium is not the essence of the invention nor particularly critical to the reaction.

The process is preferably conducted in the presence of a biphyllic ligand which forms a complex with and stabilizes the aforementioned catalyst. Use of a biphyllic ligand is, however, not essential to the process. The biphyllic ligand is a compound having at least one atom with a pair of electrons capable of forming a coordinate covalent bond with a metal atom and simultaneously having a ability to accept the electron from the metal, thereby imparting additional stability to the resulting complex. Biphyllic ligands are well known in the art and can comprise organic compounds having at least about 3 carbons and containing arsenic, antimony, phosphorus or bismuth in a trivalent state. Of these the phosphorus compounds, i.e., the phosphines, are preferred; however, the arsines, stibines and bismuthines can also be employed. In general these biphyllic ligands have the following structure:

$$E(R)_3$$

wherein E is trivalent phosphorus, arsenic, antimony or bismuth; and
wherein R is the same or different alkyl having 1 to about 10 carbons, cycloalkyl having 4 to about 10 carbons and/or aryl having 6 to about 10 carbons, examples of which are methyl, butyl, nonyl, cyclohexyl, cyclodecyl, phenyl, tolyl, xylyl, duryl, etc. Preferably at least one R is aryl, e.g., phenyl, tolyl, xylyl, etc., and, most preferably, the ligand is triaryl.

Examples of suitable biphyllic ligands having the aforementioned structure and useful in my invention to stabilize the catalyst composition are the following: trimethylphosphine, triethylarsine, triethylbismuthine, triisopropylstibine, dioctylcycloheptylphosphine, tricyclohexylphosphine, ethyldiisopropylstibine, tricyclohexylphosphine, methyldiphenylphosphine, methyldiphenylstibine, triphenylphosphine, triphenylbismuthine, tri(o-tolyl)phosphine, ethyldiphenylphosphine, phenylditolylphosphine, phenyldiisopropylphosphine, phenyldiamylphosphine, xylyldiphenylarsine, tolyldi(m-xylyl)stibine, trixylylphosphine, trixylylarsine, trixylylstibine, cyclopentyldixylylstibine, dioctylphenylphosphine, tridurylphosphine, tricumenylphosphine, trixylylbismuthine, etc. Of the aforementioned, the mono-, di- and triaryl phosphines, particularly the triarylphosphines (e.g., triphenylphosphine), are preferred because of their greater activity.

The catalyst may be complexed with the above-described biphyllic ligand before being introduced into the reaction medium or the complex may be formed "in situ" by simply adding the metal and the biphyllic ligand directly to the reaction medium. In either case, it is generally preferable that the quantity of biphyllic ligand be in excess, e.g., 10 to 300 percent of that stoichiometrically required to form a complex with the metal and is generally 0.01 to 10 weight percent of the reaction medium. The complex has from 1 to about 5 moles of biphyllic ligand per atom of the metal and other components such as hydride, or soluble anions such as sulfate, nitrate, $C_1$–$C_5$ carboxylates (e.g., acetate, propionate, isobutyrate, valerate, etc.), halide, etc. may be but need not be included in the complex catalyst of this invention. These components may be incorporated in the catalyst by the formation of the catalyst complex from a metal salt of the indicated anions. A preferred complex is one comprising at least one halide ligand, e.g., acetate, propionate, butyrate, benzoate, etc., since these groups, particularly the halides, improve the activity of the catalyst.

The process is preferably conducted in the presence of 0.01 to 10 weight percent, preferably from 0.01 to 5 percent of a strong base such as the alkali or alkaline earth metal hydroxides, e.g., sodium hydroxide, potassium hydroxide, lithium hydroxide, calcium hydroxide, magnesium hydroxide, etc. Since the nitrogen-containing reactant and the product are alkaline, the addition of further alkaline agents is not essential to operability but is only preferred for maximum activity.

The reaction is performed under liquid phase conditions. When the reactants and/or product are liquids under the reaction conditions, they can form the desired liquid phase and be diluted, if desired, with a suitable inert organic liquid, preferably a liquid which is a solvent for the reactants and catalyst. Suitable liquids include the saturated aromatic hydrocarbons which are exemplified by hexane, heptane, octane, benzene, toluene, cyclohexane, cyclodecane, etc.

The liquid phase can also be formed simply by use of an excess of the reactant amine and/or alcohol if a liquid, e.g., 2 to 100 times that stoichiometrically required for the reaction. This can be accomplished by use of an excess of one of the two reactants, e.g., excess alcohol or excess amine. Alternatively, the reactants can be used in stoichiometric proportions and the reaction is discontined before complete consumption of these reactants.

The proportions of reactants and duration of the reaction can be varied to obtain a varied degree of interchange of hydrocarbyl groups on the amine. Thus, the use of an excess of the amine, e.g., from 2 to about 10 mols per mol of alcohol or aldehyde and/or use of short reaction periods, less than about 2 hours, will insure the formation of chiefly the mono-exchanged amine product. Use of excess amounts of the alcohol or aldehyde reactant, e.g., from 2 to about 10 mols per mol of amine and/or the use of prolonged reaction periods greater than about 2 hours will promote the formation of the di- or entirely exchanged amine product wherein two or all three hydrocarbyl groups are obtained from the alcohol or aldehyde.

The process may be conducted at mild conditions such as temperatures of 50°–400° C., preferably 80°–250° C. and pressures of 1 to 70 atmospheres absolute, preferably 1 to 30 atmospheres, and sufficient to maintain liquid phase conditions. The desired pressure may be maintained by adding an inert gas, e.g., nitrogen, to the reaction mixture, however, addition of an inert gas is generally not required.

The reaction is preferably conducted in the presence of hydrogen, particularly when an aldehyde reactant is used. Even with an alcohol reactant, the reaction is preferably performed in a closed reaction vessel to prevent loss of hydrogen from the reactants with resultant dehydrogenation of the products. Any tendency for dehydrogenation can be further inhibited by introducing hydrogen into the alcohol-amine interchange reaction. When hydrogen is used, it is bubbled through the liquid reaction medium at atmospheric pressure or, preferably, the reaction can be performed under a hydrogen concentration from 10 to about 90 percent of the gas phase.

The reaction can be performed batchwise or in a continuous fashion. When operating batchwise, the catalyst, reaction medium and the primary or secondary amine, if a liquid, and the strong base, if utilized, can be introduced in the reaction zone to form a liquid phase therein. The reaction zone can be heated to the desired reaction temperature by preheating the liquid so introduced or by use of heating means in the reactor. In the case where a gaseous reactant, hydrogen, or an inert gas, is utilized, the gaseous reactant, hydrogen or inert gas can be introduced to maintain the desired reaction pressure. When performing the reaction in a continuous fashion, the liquid components can be continuously charged to the reaction zone to maintain a liquid phase therein and the amine and alcohol reactants can be continuously introduced into the reaction zone to contact the reaction medium containing the catalyst. To enhance the mixing of the reactants, any gaseous reactant can be bubbled directly into the liquid phase and/or the liquid phase can be thoroughly agitated by suitable mixers.

The products, i.e., the teritary amine and alcohol can be recovered from the reaction zone by periodically or continuously withdrawing at least a portion of the liquid reaction medium and recovering them therefrom by conventional separation processing such as distillation. The remainder of the reaction medium may be recycled to the reaction zone. Unreacted gaseous reactants and/or the inert gas, if utilized, may be taken overhead and recycled to the reaction zone. Mixtures of tertiary amine products may be formed depending on the reactants and process conditions and these may be separated by conventional processing such as distillation.

EXAMPLE 1

The following examples illustrate the invention and demonstrate the results actually obtained:

To a 250 milliliter flask equipped with a Dean-Stark tube and gas trap were added ½ gram ruthenium trichloride, 3 grams triphenylphosphine, 75 milliliters n-octanol and 5 milliliters tributylamine. The flask contents were heated to and maintained at reflux temperature (about 200° C.) for 16 hours while removing the water and an organic distillate that distilled from the flask. The gases comprised 77 percent carbon monoxide, 11 percent hydrogen and 2 percent butenes. The organic distillate was analyzed to reveal that it comprised butanol, octanol and octanal. The residue in the flask was octanal, octanol, octanoic acid, dibutyloctylamine and heptenes.

EXAMPLE 2

A steel bomb was charged with 0.5 gram ruthenium trichloride, 4 grams triphenylphosphine, 20 milliliters triethylamine and 100 milliliters butanol. The bomb was pressured to 200 p.s.i.g. with nitrogen and its contents were heated to and maintained at 175° C. for 2 hours, then at 225° C. for an additional 2 hours while rocking the bomb to agitate the contents. Upon completion of the reaction, the contents were distilled to recover 4 grams ethanol, 7 grams diethylbutylamine, 5 grams dibutylethylamine and 4 grams tributylamine.

The experiment was repeated with 50 milliliters n-octanol and 50 milliliters of triethylamine with the same amounts of catalyst and ligand. The bomb was pressured to 100 p.s.i.g. with hydrogen and its contents were heated to and maintained at 225° C. for 6 hours while rocking the bomb to agitate the contents. Distillation of the bomb contents yielded dioctylethylamine, octanol, octyldiethylamine, ethanol and triethylamine.

EXAMPLE 3

A steel bomb wase charged with 50 milliliters tributylamine, 0.5 gram ruthenium trichloride, 0.5 gram ammonium perrhenate, 3 grams triphenylphosphine and 25 milliliters octanal. The bomb was pressured to 600 p.s.i.g. with hydrogen and its contents were heated to and maintained at 225° C. for 5 hours. The bomb contents were distilled to recover 10 grams of dibutyloctylamine.

The preceding examples are intended solely to illustrate the preferred mode of practice using the preferred catalysts and/or reactants. It is not intended that these examples be construed as unduly limiting of the invention. Instead, changes from the practice illustrated herein such as substitution of any of the disclosed catalyst, e.g., osmium, technetium or rhenium catalysts for the ruthenium employed in these examples and similar products but at lower conversion rates can be expected. Similarly, any of the aforementioned reactants can be substituted for those employed in the examples using, when necessary, any of the aforementioned solvents to dissolve the reactants and provide a liquid reaction medium.

It is intended that the invention be defined by the reagents, catalysts and steps, and their obvious equivalents, set forth in the following claims.

I claim:

1. The process for the interchange of hydrocarbyl groups between an aldehyde or alcohol and a trihydrocarbylamine wherein a saturated aliphatic or alicyclic aldehyde and hydrogen or alcohol having from 1 to about 20 carbons is contacted with an amine having from 1 to about 20 carbons and the structure:

$$R_3N$$

wherein R is the same or different alkyl having from 1 to about 18 carbons or monocyclic cycloalkyl or aryl having from 6 to about 18 carbons in a liquid reaction medium containing 0.001 to 5 weight percent of a complex of ruthenium with an aryl phosphine having the structure:

$$PR_3$$

wherein R is the same or different alkyl having 1 to 10 carbons, cycloalkyl having 4 to 10 carbons or phenyl or alkylphenyl having 6 to 10 carbons and at least one R is phenyl or alkylphenyl at a temperature of 50° to 400° C. and a pressure of 1 to 200 atmospheres, sufficient to maintain liquid phase conditions.

2. The process of claim 1 wherein the complex is formed from ruthenium halide.

3. The process of claim 1 wherein said amine is an alkylamine and said alcohol is an alkanol.

4. The process of claim 3 wherein said complex is formed from ruthenium halide.

5. The process of claim 1 wherein said reaction medium also contains from 0.01 to 10 weight percent of an alkali or alkaline earth metal hydroxide.

6. The process of claim 1 wherein said reaction medium also contains from 0.01 to 5 weight percent of an alkali or alkaline earth metal hydroxide.

7. The process of claim 1 wherein said arylphosphine is triphenylphosphine.

8. The process of claim 1 wherein said amine is an alkylamine having 1 to 15 carbons and said alcohol is an alkanol having 1 to 15 carbons.

9. The process of claim 8 wherein said arylphosphine is triphenylphosphine.

10. The process of claim 8 wherein said reaction medium contains a complex between ruthenium and triphenylphosphine, and ammonium perrhenate.

References Cited

UNITED STATES PATENTS 3,513,200   5/1970   Biale _____ 260—583 R

OTHER REFERENCES

Spialter et al., The Acylic Aliphatic Tertiary Amines, Macmillan (New York), 1965, p. 35.

LEWIS GOTTS, Primary Examiner

R. L. RAYMOND, Assistant Examiner

U.S. Cl. X.R.

252—430, 431 P; 260—563 R, 570.8 R, 570.9, 576, 577, 638 R, 642